United States Patent
Ford et al.

(10) Patent No.: US 9,712,483 B1
(45) Date of Patent: Jul. 18, 2017

(54) AUTOMATED CHECK FOR SIMPLE MAIL TRANSFER PROTOCOL EMAIL DELAYS

(71) Applicant: Sprint Communications Company L.P., Overland Park, KS (US)

(72) Inventors: Justin L. Ford, Orlando, FL (US); Jose C. Torres, Maitland, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 31 days.

(21) Appl. No.: 14/174,617

(22) Filed: Feb. 6, 2014

(51) Int. Cl.
G06F 15/16 (2006.01)
H04L 12/58 (2006.01)
H04L 12/26 (2006.01)

(52) U.S. Cl.
CPC .......... H04L 51/34 (2013.01); H04L 43/0852 (2013.01)

(58) Field of Classification Search
CPC ........................................................ H04L 51/08
See application file for complete search history.

(56) References Cited

U.S. PATENT DOCUMENTS

| | | | |
|---|---|---|---|
| 7,054,907 B1 | 5/2006 | Sherwood | |
| 7,093,025 B1 | 8/2006 | Gupta | |
| 7,917,576 B1 * | 3/2011 | Kling | H04L 12/5835 709/203 |
| 7,970,844 B2 * | 6/2011 | Osborne | H04L 51/30 709/206 |
| 8,122,089 B2 * | 2/2012 | Kay | G06Q 10/107 709/204 |
| 8,725,889 B2 * | 5/2014 | Petry | H04L 12/585 709/230 |
| 9,584,462 B1 | 2/2017 | Chen et al. | |
| 2001/0032245 A1 * | 10/2001 | Fodor | H04L 12/5885 709/206 |
| 2002/0078052 A1 | 6/2002 | Cheng | |
| 2002/0120697 A1 | 8/2002 | Generous et al. | |
| 2006/0233310 A1 | 10/2006 | Adams et al. | |
| 2006/0242251 A1 * | 10/2006 | Estable | H04L 51/12 709/207 |
| 2007/0036146 A1 | 2/2007 | Adkins et al. | |

(Continued)

OTHER PUBLICATIONS

FAIPP Pre-Interview Communication dated Oct. 22, 2015, U.S. Appl. No. 14/174,615, filed Feb. 6, 2014.

(Continued)

*Primary Examiner* — Umar Cheema
*Assistant Examiner* — Tesfu Mekonen

(57) ABSTRACT

A system for automated monitoring simple mail transfer protocol (SMTP) email delays. The system comprises a data store to store message identifiers for sent emails and a first monitoring server. The first monitoring server comprises a processor, a memory, and an application stored in the memory that, when executed by the processor, builds a test email with a message identifier in a header of the email, creates an entry with the message identifier in the data store, sends the email through internal email servers to an external email system with a public distribution list (PDL), obtains average time duration for an email to be delivered, and sends an alert when the email is not received after a predefined period of time, whereby the entire delivery path of the test email is examined by sending the test email in the same email system as ordinary emails.

16 Claims, 4 Drawing Sheets

(56) References Cited

U.S. PATENT DOCUMENTS

2009/0077182 A1* 3/2009 Banjara .................. H04L 51/34
709/206
2012/0284566 A1* 11/2012 Katz ...................... H04L 43/50
714/32

OTHER PUBLICATIONS

FAIPP Office Action dated Jan. 28, 2016, U.S. Appl. No. 14/174,615, filed Feb. 6, 2014.
Chen, Anthony D., et al., Patent Application entitled "Universal Email Failure Notification System," filed Feb. 6, 2014, U.S. Appl. No. 14/174,615.
Final Office Action dated Apr. 28, 2016, U.S. Appl. No. 14/174,615, filed Feb. 6, 2014.
Notice of Allowance dated Oct. 14, 2016, U.S. Appl. No. 14/174,615, filed Feb. 6, 2014.
Advisory Action dated Jul. 11, 2016, U.S. Appl. No. 14/174,615, filed Feb. 6, 2014.

* cited by examiner

AUTOMATED CHECK FOR SIMPLE MAIL TRANSFER PROTOCOL EMAIL DELAYS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The Internet is becoming increasingly prevalent in our daily lives with the rapid development and popularization of portable network capable devices. Additionally, more and more electronic devices that did not have network capabilities are becoming network capable. With the development of the Internet, electronic mail (email) has become one of the most common ways people communicate. Most current emails are carried by the simple mail transfer protocol (SMTP).

SUMMARY

In an embodiment, a system for automated monitoring simple mail transfer protocol (SMTP) email delays is disclosed. The system comprises a data store to store message identifiers for sent emails and a first monitoring server. The first monitoring server comprises a processor, a memory, and an application stored in the memory that, when executed by the processor, builds a test email with a message identifier in a header of the email, creates an entry with the message identifier in the data store, sends the email through internal email servers to an external email system with a public distribution list (PDL), obtains average time duration for an email to be delivered, and sends an alert when the email is not received after a predefined period of time. The system further comprises a second monitoring server that receives the email relayed back from the external email system through the internal email servers, processes the email, finds the entry in the data store of the first monitoring server based on the message identifier, and updates the entry in the data store with information collected along the delivery path of the email, whereby the entire delivery path of the test email is examined by sending the test email in the same email system as ordinary emails.

In an embodiment, a method of automated monitoring simple mail transfer protocol (SMTP) email delays is disclosed. The method comprises building a test email by a first monitoring server with a message identifier in a header of the email, creating an entry with the message identifier in a data store of the first monitoring server, sending the email through internal email servers to an external email system, wherein the external email system is provided with a public distribution list (PDL), and receiving the email relayed back from the external email system through the internal email servers at a second monitoring server. The method further comprises processing the email by the second monitoring server, finding the entry in the data store of the first monitoring server based on the message identifier, updating the entry by the second monitoring server in the data store with information collected along the delivery path of the email, obtaining average time duration for an email to be delivered, and sending an alert when the email is not received after a predefined period of time based on the average time duration for email delivery.

In an embodiment, a method of automated monitoring simple mail transfer protocol (SMTP) email delays is disclosed. The method comprises building a test email by a first monitoring server with a message identifier in a header of the email, creating an entry with the message identifier in a data store of the first monitoring server, sending the email through internal email servers to an external email system, wherein the external email system is provided with a method of email forwarding, and receiving the email relayed back from the external email system through the internal email servers at a second monitoring server. The method further comprises processing the email by the second monitoring server, updating the corresponding entry by the second monitoring server in the data store with information collected along the delivery path of the email, and sending an alert when the email is not received after a predefined period of time, whereby the entire delivery path of the test email is examined by sending the test email in the same email system as ordinary emails.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
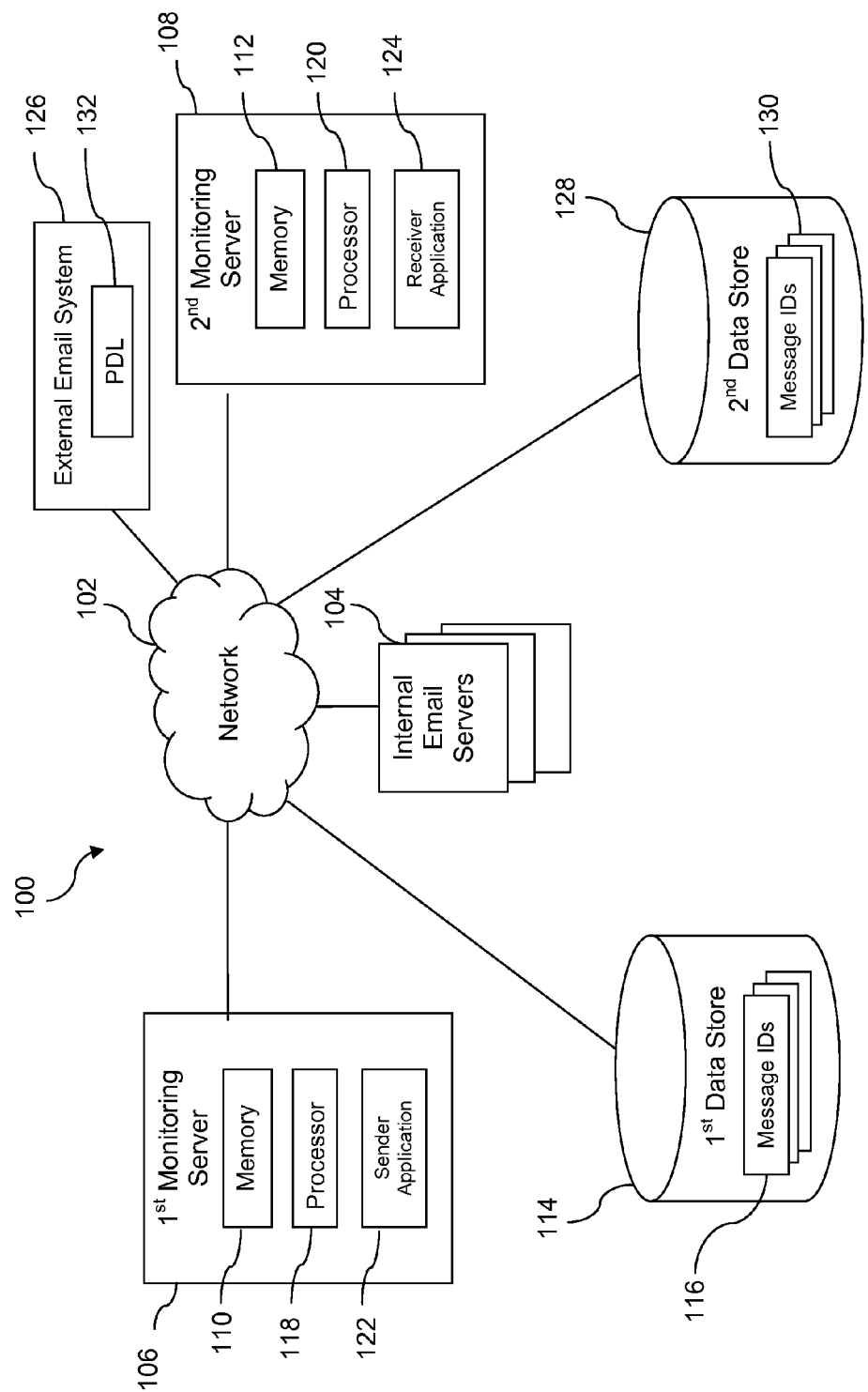
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Problems may be caused when emails fail to deliver to corresponding recipients. The problems may result from email servers that transmit or relay the email or communication links among the email servers. Additionally, the problems may result from an internal email system of an organization or an external email system outside the organization. An organization with an internal email system may choose to monitor the internal email system to maintain its functionality. The present disclosure teaches a system and method for proactively monitoring communications behavior of an internal email system and sending alerts under predefined circumstances.

For example, a sender application on a first monitoring server in an email monitoring system of an organization may periodically build a test email with a message identifier in a header of the email. An entry may be created with the message identifier in a data store to store related information of the email, for example time when the email is sent, a list of outgoing email servers with priority, or other related information. The sender application may then send the test email through an outgoing email server, for example an internal email server of the organization, to an external email system. The internal email server may add information to the header of the email, for example identification of the internal email server, time when the email arrives at the internal email server, time when the email is transmitted by the internal email server, or other related information. The external email system may host a method of email forwarding such as a public distribution list (PDL) with an email address to relay the test email. The address to relay the test email may be a predefined email address that is located within the internal email system.

For example, the test email may be relayed back to a returning email server. For example, the test email may be first relayed back to a cluster of the internal email servers, and then a load balancer may determine which internal email server to pass the test email through. Alternatively, the test email may be relayed back to a predefined specific internal email server. In this case, each internal email server may pass the associated test email. In either case, the test email may be relayed back to a second monitoring server of the email monitoring system by an internal email server. Thus, the test email may be delivered through a delivery path where ordinary emails may be delivered. In other words, the test email may be sent through a same email system where ordinary emails are sent through. When the test email is received at the second monitoring server, a receiver application on the second monitoring server may process the test email and find the corresponding entry in the data store based on the message identifier in the header of the email.

The receiver application may update the associated entry in the data store with information collected along the delivery path of the email, for example the outgoing internal email server identification, the returning email server identification, the time when the email was transmitted by the outgoing internal email server, the time when the email was transmitted by the returning email server, or other related information. A notice may be sent to the sender application on the first monitoring server when any entry in the data store is updated. Alternatively, the sender application may periodically examine the entries in the data base for any update. The sender application may obtain average time duration for an email to be delivered based on the updated entries in the data store.

When an email fails to deliver after a period of time calculated based on the average time duration for email delivery, the sender application may send an alert to related personnel, for example a system administrator. The entire delivery path of the test email may then be examined. With the information collected along the delivery path of the test email, the location(s) where the test email was delayed or dropped may be determined. This way, when a route of the test emails has problem delivering the test emails, the route and/or the locations on the route may be identified and the problem may be fixed promptly. Thus, prompt identification of problems in the email system may be promoted and identified problems may be fixed.

Turning now to FIG. 1, a communication system 100 is described. In an embodiment, the system 100 comprises a plurality of internal email servers 104, a first monitoring server 106, a second monitoring server 108, and an external email system 126. The monitoring server 106/108 may comprise a memory 110/112, a processor 118/120, and a sender application 122 or receiver application 124. The first monitoring server 106 may be coupled to a first data store 114. The first monitoring server 106 and the second monitoring server 108 may be located at different physical locations. The first data store 114 may comprise message identifiers (IDs) 116 and/or other related information regarding emails sent. The internal email servers 104 are coupled to a network 102. The internal email servers may be referred to herein as either returning email server(s) 104 or outgoing email server(s) 104. The external email system 126 may also have access to the network 102. The network 102 may comprise any combination of private and public networks.

The first monitoring server 106 and the first data store 114 may locate in one computer—for example, a server computer, in two different computers—for example, a server computer for the first monitoring server 106, and another computer for the first data store 114, in multiple different computers—for example, multiple server computers for the first monitoring server 106, and other multiple computers for the first data store 114, or in some other combination of computers. The second monitoring server 108 may also be coupled to a data store. For example the second monitoring server 108 may be coupled to a second data store 128.

It is understood that the system 100 may comprise any number of internal email servers 104. The monitoring servers 106 and 108, the internal email servers 104, and the external email system 126 may be any of a desktop computer, a server computer, or another network capable device. The monitoring servers 106 and 108 and the internal email servers 104 may communicate through a private internal network and/or public external network. The internal email servers 104 and the external email system 126 may communicate through a public external network. The monitoring servers 106 and 108, the internal email servers 104, and the external email system 126 may access the network 102 through a wired or a wireless access network. The wired access network may be abstracted in different ways and may comprise cable modems and Ethernet routers, switches, or hubs. The wireless access network may also be abstracted in different ways and may comprise wireless access points, cable modems, Ethernet or wireless routers, switches, or hubs, servers and data storages such as home location registers (HLRs) or servers that implement the functionality of home location registers, visitor location registers (VLRs) or servers that implement the functionality of visitor location registers, base transceiver stations, base station controllers (BSCs), mobile switching centers (MSCs), and other network nodes that are specifically associated with providing wireless access and connectivity to the servers and the external email system.

In an embodiment, the internal email servers 104 and the external email system 126 may collaborate to provide email service to employees of an enterprise and/or to users. The email may be from one employee to another employee within an internal network at one physical location of the enterprise. The email may be between employees at different physical locations, for example a first employee in Boston to a second employee in San Francisco. The email may be from an employee to a client or to a customer. In some of these examples, delivery of email may entail transiting the external email system 126.

The external email system 126 is an email system outside the domain of a network service provider or another enterprise, for example outside the private network of the network service provider or another enterprise. In an embodiment, the external email system 126 may be provided with a predefined public distribution list (PDL) 132. Based on the public distribution list, the external email system 126 may relay a test email passed from an internal email server 104 back to a predefined email address that is located within the internal email system, for example to an internal email server 104. In a first embodiment, the test email may be transmitted to a cluster of the internal email servers 104. A load balancer application may determine which internal email server 104 to pass the test email through. In a second embodiment, the test email may be transmitted to a predetermined internal email server 104. For example, one test email may be built to be relayed by the external email system 126 to one internal email server 104. In other words, the same number of test emails as the number of internal email servers 104 may be built at a time, and each test email may be passed to a predefined internal email server 104. Each internal email server may have one email to be passed if the email has not been lost. In either embodiment, the test email may be passed by the internal email server 104 to the second monitoring server 108.

The first data store 114 of the first monitoring server 106 may keep records of test emails sent. In an embodiment, the first data store 114 may store entries with information of test emails sent. For example, when the email is built to be sent, an entry may be created by the sender application 122 in the first data store 114 comprising a message identifier 116 of the email, the timestamp of when the test email is sent, an outgoing email server, and placeholder values for fields that may be populated upon successful delivery of the email to the end user, or other related information regarding the email sent. When the email is successfully delivered, for example at the second monitoring server 108, the second monitoring server 108 may update the entry in the first data store 114 with information collected along the delivery path of the email and accumulated within the email. For example, the second monitoring server 108 may find the associated entry in the first data store 114 based on the message identifier 116 in the header of the received email and update values of the entry. For example, the second monitoring server 108 may add time of receipt of the email to the entry, add a returning email server to the entry, update the placeholder value to indicate the email has been successfully delivered, or update other related information collected along the delivery path of the received email to the entry.

Entries in the data store may be used by the sender application 122 to examine routes and/or internal email servers 104 that have trouble delivering emails. For example, when a test email is received at the second monitoring server 108 after a delay longer than a predefined period of time, the sender application 122 may examine the corresponding entry in the first data store 114 based on the message identifier 116 to determine the route or internal email server 104 that has trouble delivering or receiving emails. When a test email is not received at the second monitoring server 108 after a delay longer than a predefined period of time, the sender application 122 may examine the corresponding entry in the first data store 114 based on the message identifier 116 to determine the route or internal email server 104 that has trouble delivering emails.

The internal email server 104 may transmit emails to and from the external email system 126. For example, the internal email server 104 may transmit an email from the first monitoring server 106 to the external email system 126. Additionally, the internal email server 104 may transmit an email from the external email system 126 to the second monitoring server 108. When the internal email server 104 transmits a test email, the internal email server 104 may add related information into the header of the email, for example a timestamp of when the internal email server 104 received the email and a timestamp of when the internal email server 104 transmits the email.

The second monitoring server 108 may receive the test email and take further action. To be specific, the receiver application 124 on the second monitoring server 108 may receive the test email and take further action. The receiver application 124 may be stored in the memory 112 of the second monitoring server 108. When executed by the processor 120, the receiver application 124 may receive the test email relayed back from the external email system 126 through the internal email server 104 and process the email. The receiver application 124 may find the entry in the first data store 114 based on the message identifier 116 in the header of the received test email. The information collected along the delivery path of the email may also be stored in the email itself as the email transits the internal email servers 104, the network 102, and the external email system 126. The entry in the first data store 114 may be updated by the receiver application 124 with information collected along the delivery path of the email. For example, an actual outgoing email server 104 that sent the email, a timestamp when the email was sent by the outgoing email server 104, the returning email server 104, the timestamp when the email arrived at and left the returning email server 104, or other related information collected along the delivery path of the email.

The sender application 122 on the first monitoring server 106 may be stored in the memory 110. When executed by the processor 118, the sender application 122 may build the test email, send out the email, and take further action. For example, the application 122 may build the test email with a message identifier 116 in a header of the email. The message identifier 116 may be a unique number in the first data store 114 for each outgoing email and so may be used to identify an email. A revolving pool of message identifiers 116 may be used and a message identifier 116 for an outgoing email may not be unique for all times, but may be unique over a meaningful time window, for example 1 hour, 1 day, 1 week, 1 month, or another time period.

The application 122 may keep records for emails sent. For example, the application 122 may create an entry with the message identifier 116 in the first data store 114 for the email sent out to the external email system 126. The entry may comprise information about the outgoing email, for example the message identifier 116 of the email, a timestamp of when the test email is sent, an outgoing email server, and placeholder values for fields that may be populated upon successful delivery of the email to the end user, or other information about the email sent.

The application 122 may then send the email through internal email servers 104 to the external email system 126. The test emails may be sent by the sender application 122 periodically, for example once every 5 minutes, once every 15 minutes, once every 30 minutes, or at another time interval. Different numbers of test emails may be sent out every time, for example one email at a time, two emails at a time, the same number of emails as the internal email servers at a time, or at another number. In a first embodiment, the test email may be transmitted from the first monitoring server 106 to a cluster of the internal email servers 104. A load balancer application may determine which internal email server 104 to pass the test email through. In a second embodiment, the test email may be transmitted from the first monitoring server 106 to a predetermined internal email server 104. For example, one test email may be built to be sent by the first monitoring server 106 to one internal email server 104. In other words, the same number of test emails as the number of internal email servers 104 may be built at a time, and each test email may be transmitted by the first monitoring server 106 to a predefined internal email server 104. Each internal email server 104 may have one email to be passed to the external email system 126 if the email has not been lost. In either embodiment, the test email may be passed by the internal email server 104 to the external email system 126.

When the test email is sent out by the sender application 122, an outgoing route for the email is controlled by the sender application 122. For example, the internal email server 104 to pass the test email is predetermined by the sender application 122. Additionally, a priority list of internal email server 104 is maintained for each outgoing test email. For example, if internal email server number 1 is down, the next internal email server 104 on the priority list may be used to pass the test email, for example internal email server number 3. The priority list of internal email servers 104 for the test email may be stored in the associated entry in the first data store 114.

The email may be relayed by the external email system 126 back to the internal email server 104, and may then be passed by the internal email server 104 to the second monitoring server 108. When the email is received at the second monitoring server 108, the associated entry in the first data store 114 may be updated by the second monitoring server 108 based on the message identifier 116.

The sender application 122 may be notified with a notice from the first data store 114 about the update of the entry with the associated message identifier 116. Alternatively, the sender application 122 may check periodically on the entries in the first data store 114 for any update, for example every 30 seconds, every minute, every two minutes, or at another time interval. When the entry in the first data store 114 is updated after the test email has been successfully delivered, the sender application 122 may examine the information of the updated entry. For example, the sender application 122 may examine the timestamps of when the email was sent from the first monitoring server 106 and when the email was delivered at the second monitoring server 108. The sender application 122 may calculate the duration for the email to be delivered based on the examined timestamps.

The sender application 122 may keep a record of a statistical mean or average of time duration for emails to be successfully delivered. The time duration for an email to be delivered may be calculated over a recent window of time, for example based on email delivery time duration over the most recent half an hour, over the most recent one hour, over the most recent two hours, or some other time interval. The sender application 122 may recalculate or re-determine the statistical mean or average periodically, for example every 20 minutes, every one hour, every 1.5 hours, or some other period of time. Note that the period of time over which data is collected for determining means may be different from the period of time when the means are re-determined or recalculated. For example, the mean may be determined using data collected over the last three hours, and the mean may be determined every 20 minutes.

A derived value of the average email delivery duration may be utilized as a threshold to determine whether an email is delayed. For example, the threshold may be 1.5 times the average email delivery duration. Alternatively, the threshold may be twice the average email delivery duration, or another derived value of the average email delivery duration. Network traffic may vary under different circumstances and this may affect the average delivery time for emails. Thus, the threshold may be dynamic and may be adjusted under predefined circumstances.

For example, the threshold may be calculated for different times of the day, different times of the month, different times of the year, or for another period of time. For example, a threshold may be calculated and tested for different time blocks of a day, and demarcation of the day to utilize a different formula to calculate the threshold may be determined. For example, a threshold may be calculated using a first formula for time blocks of from 8:01 am to 12 pm, from 12:01 pm to 4:00 pm, from 4:01 pm to 8:00 pm, from 8:01 pm to 12:00 am, from 12:01 am to 4:00 am, and from 4:01 am to 8:00 am. The threshold calculated using the first formula in time blocks from 12:01 am to 04:00 am and from 04:01 am to 08:00 am may be determined to be reasonable one day. On the same day, the threshold calculated using the second formula in time blocks from 8:01 am to 12 pm, from 12:01 pm to 4:00 pm, from 4:01 pm to 8:00 pm, and from 8:01 pm to 12:00 am may be determined to be reasonable. On another day, the threshold calculated using the first formula in time blocks from 12:01 am to 4:00 am and from 4:01 am to 8:00 am may be determined to be not reasonable, and the threshold may be calculated using a second formula. As another example, at the end of each billing cycle in a month, heavy traffic may affect the average email delivery time duration and the threshold may be adjusted.

When an email is not delivered after a period of time defined by the threshold, the sender application 122 may send a first alert, for example to a web administrator. The first alert may be an ordinary alert. When a number of emails, for example larger than a predefined amount, failed to be delivered after a period of time defined by the threshold, the sender application 122 may send a second alert, which may be an alert of a higher priority level than the ordinary alert.

When an email is delivered after a delay longer than the period of time defined by the threshold, the sender application 122 may determine the route that introduced the delay. For example, the sender application 122 may examine information along the delivery path of the email, for example the internal email servers 104 that passed the email, timestamps of the email at each internal email server 104, or other related information along the delivery path of the email. The email server that introduced the delay may be determined by the sender application 122 and an alert may be sent.

When an email failed to be delivered after a predefined period of time, the sender application 122 may determine the route of the email by examining the associated record in the first data store 114. For example, the sender application 122 may examine the outgoing email server record in the corresponding entry in the first data store 114. The route that has trouble delivering the email may be determined. To be specific, the internal email server(s) 104 that failed to deliver the email may be determined, and further action may be taken. For example, relevant personnel, for example a system administrator, may be notified of the determined internal email server(s) 104.

Although the communication system 100 in FIG. 1 is not shown to be symmetric, the communication system 100 may be symmetric in some embodiments. For example, the second monitoring server 108 may comprise a sender application and the first monitoring server 106 may comprise a receiver application. Test emails may be sent from the second monitoring server 108 through the internal email servers 104 and through the network 102, relayed by the external email system 126, relayed back to the internal email servers 104, and delivered to the first monitoring server 106. Relevant information of the outgoing test emails may be stored in the second data store 128 when the test emails are sent from the second monitoring server 108. For example, the second data store 128 may comprise message identifiers (IDs) 130 and/or other related information regarding emails sent. Information may be collected along the delivery path of the test emails and may be updated by the first monitoring server 106 in the second data store 128. Other similar action may be taken when the test emails are sent from the second monitoring server 108 as when the test emails are sent from the first monitoring server 106.

Figure 2:
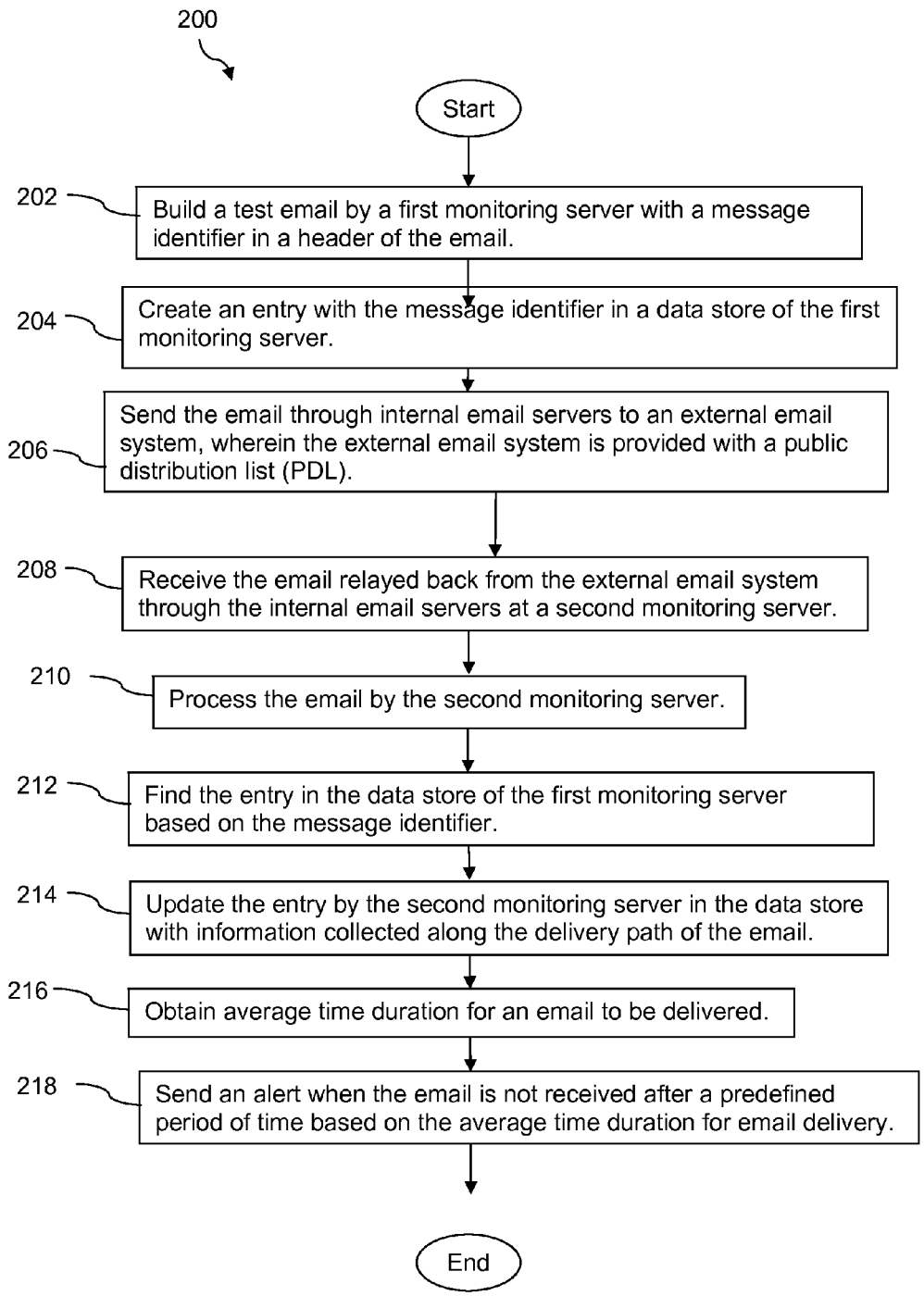
FIG. 2 is a flow chart illustrating a method according to an embodiment of the disclosure.

Turning now to FIG. 2, a method 200 is described. At block 202, a test email is built by a first monitoring server with a message identifier in a header of the email. For example, a test email may be built by the first monitoring server 106 with a message identifier 116 in a header of the email. At block 204, an entry is created with the message identifier in a data store of the first monitoring server. For example, an entry with the message identifier 116 may be created in the first data store 114. Besides the message identifier 116, related information may be stored in the entry, for example a timestamp when the email is sent, an outgoing priority list of internal email servers 104 to pass the test email through, or other related information. At block 206, the email is sent through internal email servers to an external email system, wherein the external email system is provided with a public distribution list (PDL). For example, the email is sent through internal email servers 104 to the external email system 126. The external email system 126 may be provided with a public distribution list 132 that comprises returning email server address to pass the email to, for example an internal email server 104.

At block 208, the email relayed back from the external email system through the internal email servers is received at a second monitoring server. For example, the email relayed back through the internal email servers 104 may be received by the second monitoring server 108. At block 210, the email is processed by the second monitoring server 108. At block 212, the entry is found in the data store of the first monitoring server based on the message identifier. For example, the associated entry with the same message identifier 116 may be found by the second monitoring server 108 in the first data store 114. At block 214, the entry is updated by the second monitoring server 108 in the first data store 114 with information collected along the delivery path of the email. In an embodiment, information collected along the delivery path of the email may be added to the entry in the first data store 114, for example an actual internal email server 104 that passed the email, a timestamp of when the actual internal email server 104 transmitted the email, time of the receipt of the email, a returning email server 104, a timestamp of when the returning email server 104 transmitted the email, or other related information.

At block 216, average time duration for an email to be delivered is obtained. For example, the sender application 122 may check entries in the first data store 114 to calculate average time duration for an email to be delivered. At block 218, an alert is sent when the email is not received after a predefined period of time based on the average time duration for email delivery. For example, when an email is not received after a predefined period of time, the sender application 122 may send an alert to related personnel, for example a system administrator. The predefined period of time is determined based on the average time duration for email delivery. For example, the predefined period of time may be twice the average time duration for email delivery.

Figure 3:
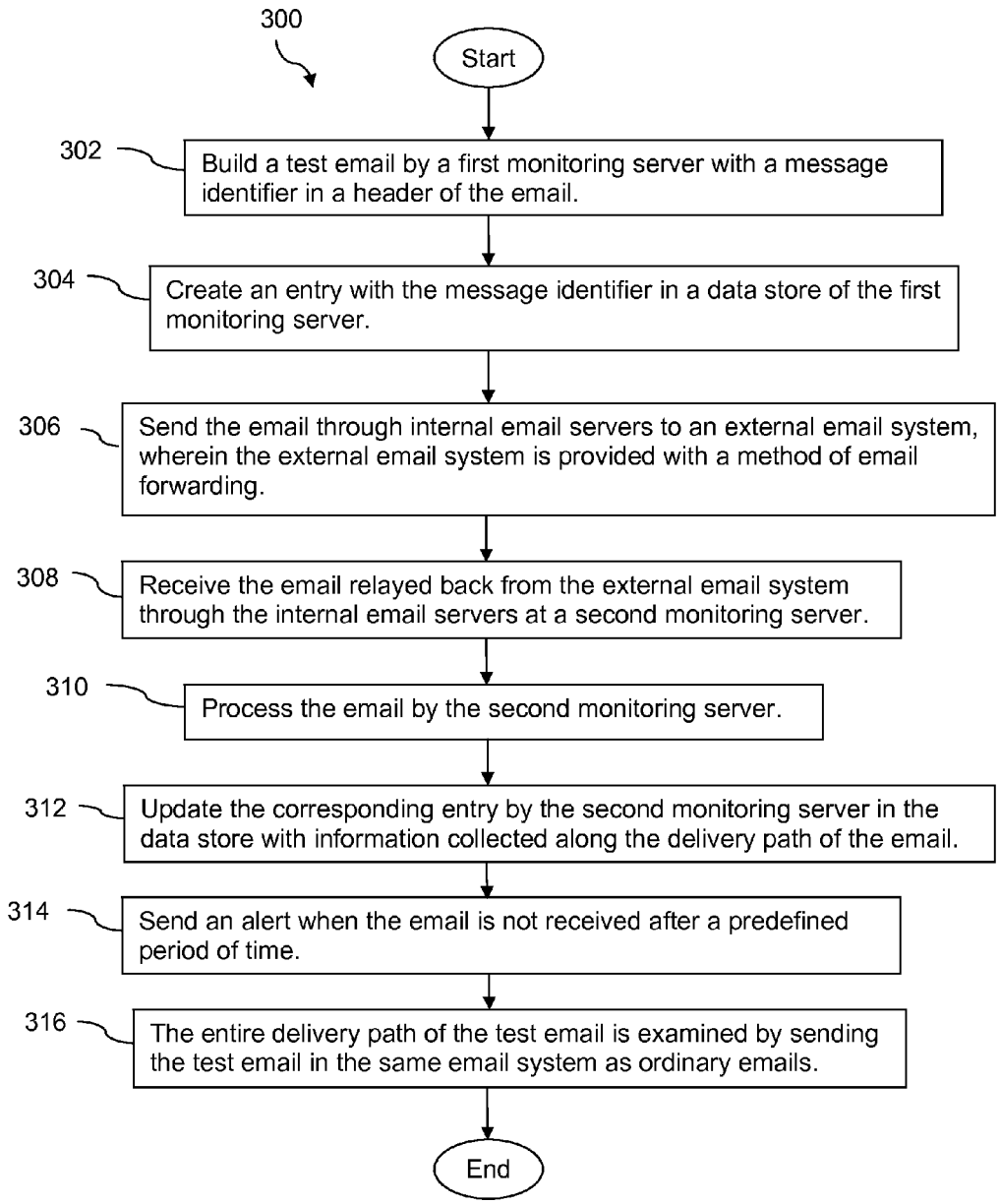
FIG. 3 is a flow chart illustrating another method according to an embodiment of the disclosure.

Turning now to FIG. 3, a method 300 is described. At block 302, a test email is built by a first monitoring server 106 with a message identifier 116 in a header of the email. At block 304, an entry is created with the message identifier 116 in a first data store 114 of the first monitoring server 106. At block 306, the email is sent through internal email servers 104 to an external email system 126, wherein the external email system is provided with a method of email forwarding. For example, the email may be sent through the internal email servers 104 to the external email system 126, and the external email system 126 may be provided with a public distribution list (PDL) 132. At block 308, the email relayed back from the external email system 126 through the internal email servers 104 is received at a second monitoring server 108. At block 310, the email is processed by the second monitoring server 108. For example, the message identifier 116 in the header of the email is read. Information collected along the delivery path of the email may also be read by the second monitoring server 108, for example an actual email server 104 that transmitted the email to the external email system 126, a returning email server 104, or other related information collected on the delivery path of the email.

At block 312, the corresponding entry is updated by the second monitoring server 108 in the first data store 114 with information collected along the delivery path of the email. At block 314, an alert is sent when the email is not received after a predefined period of time. At block 316, the entire delivery path of the test email is examined by sending the test email in the same email system as ordinary emails. For example, when an email is received at the second monitoring server 108 after a predefined period of time, the sender application 122 may examine the detail information collected along the delivery path of the email. For example, the list of outgoing email server priority may be compared with the actual outgoing email server. When an outgoing email server that has the highest priority was not chosen to pass the email, it may be determined that the outgoing email server with the highest priority may have trouble delivering emails. When outgoing email servers that have higher priority than the actual outgoing email server were not chosen to pass the email, it may be determined that the outgoing email servers with higher priority may have trouble delivering emails.

Figure 4:
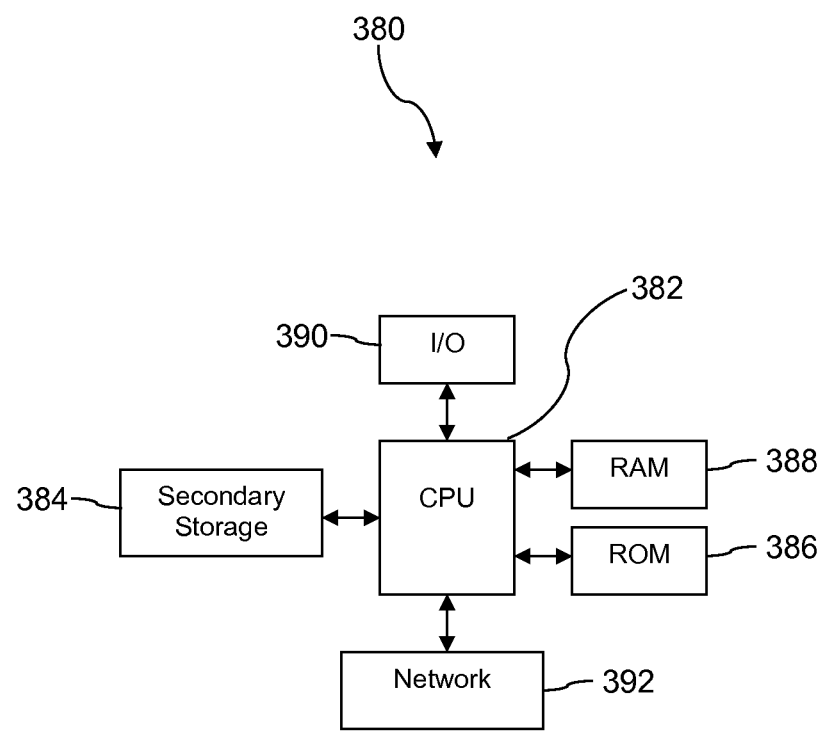
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for automated monitoring simple mail transfer protocol (SMTP) email delays, comprising:
a data store that stores message identifiers for sent emails;
a first monitoring server, comprising:
a processor,
a non-transitory memory, and
an application stored in the memory that, when executed by the processor:
builds a test email with a message identifier in a header of the test email,
creates an entry with the message identifier in the data store,
controls an outgoing route of the test email through a plurality of internal email servers of an internal email system within an internal network of an enterprise, wherein the outgoing route of the test email through the plurality of internal email servers is determined by the application based on a priority list of the plurality of internal email servers,
sends the test email through the plurality of internal email servers of the internal email system based on the priority list to an external email system, wherein the external email system has been provided with a public distribution list (PDL) to relay the test email back to the plurality of internal email servers,
obtains a time duration for the test email to be delivered, and
sends an alert when the test email is not received by a second monitoring server within a predefined period of time based on the obtained time duration due to a delay; and
the second monitoring server that:
receives the test email relayed back from the external email system through the plurality of internal email servers,
processes the test email,
finds the entry in the data store of the first monitoring server based on the message identifier, and
updates the entry in the data store with information collected along a delivery path of the test email, wherein the information comprises each internal email server of the plurality of internal email servers that passed the test email along the delivery path and a timestamp associated with the test email at each internal email server of the plurality of email servers along the delivery path, and wherein the first monitoring server determines which internal email server of the plurality of internal email servers caused the delay based on the information in response to a determination that the test email is not received by the second monitoring server within the predefined period of time.

2. The system of claim 1, wherein test emails are sent at various times of a day, and wherein an average time duration for each of the test emails to be delivered at the various times of the day is obtained.

3. The system of claim 2, wherein a time delay threshold for sending the alert is dynamic and is adjusted at the various times of the day based on the average time duration for email delivery determined at the various times of the day.

4. The system of claim 1, wherein the test email is sent periodically.

5. The system of claim 1, wherein a time at which the test email is sent is recorded in the entry in the data store.

6. A method of automated monitoring simple mail transfer protocol (SMTP) email delays, comprising:

building, by an application stored in a non-transitory memory of a first monitoring server and executable by a processor of the first monitoring server, a test email with a message identifier in a header of the test email;

creating, by the application, an entry with the message identifier in a data store of the first monitoring server;

controlling, by the application, an outgoing route of the test email through a plurality of internal email servers of an internal email system within an internal network of an enterprise, wherein the outgoing route of the test email through the plurality of internal email servers is determined by the application based on a priority list of the plurality of internal email servers;

sending, by the application, the test email through the plurality of internal email servers of the internal email system based on the priority list to an external email system, wherein the external email system has been provided with a public distribution list (PDL) to relay the test email back to the plurality of internal email servers;

receiving, by a second monitoring server, the test email relayed back from the external email system through the plurality of internal email servers;

processing, by the second monitoring server, the test email;

finding, by the second monitoring server, the entry in the data store of the first monitoring server based on the message identifier;

updating, by the second monitoring server, the entry in the data store with information collected along a delivery path of the test email, wherein the information comprises each internal email server of the plurality of internal email servers that passed the test email along the delivery path and a timestamp associated with the test email at each internal email server of the plurality of email servers along the delivery path;

obtaining, by the application, a time duration for the test email to be delivered;

in response to a determination that the test email is not received by the second monitoring server within a predefined period of time based on the obtained time duration due to a delay, determining, by the application, which internal email server of the plurality of internal email servers caused the delay based on the information; and sending, by the application, an alert in response to the determination that the test email is not received by the second monitoring server within the predefined period of time.

7. The method of claim 6, wherein a second data store is associated with the second monitoring server.

8. The method of claim 6, wherein the test email is relayed back to a cluster of the plurality of internal email servers based on the PDL, and wherein a load balancer application determines which of the plurality of internal email servers to send the test email through.

9. The method of claim 6, wherein the test email is sent from the external email system to a specific internal email server of the plurality of internal email servers.

10. The method of claim 6, wherein an average time duration for test emails to be delivered to the second monitoring server at different times is obtained.

11. The method of claim 6, wherein a time delay threshold for sending the alert is dynamic and is adjusted at various times of a month.

12. The method of claim 6, wherein an outgoing email server is recorded in the entry in the data store.

13. A method of automated monitoring simple mail transfer protocol (SMTP) email delays, comprising:

building, by an application stored in a non-transitory memory of a first monitoring server and executable by a processor of the first monitoring server, a test email with a message identifier in a header of the test email;

creating, by the application, an entry with the message identifier in a data store of the first monitoring server;

controlling, by the application, an outgoing route of the test email through a plurality of internal email servers of an internal email system within an internal network of an enterprise, wherein the outgoing route of the test email through the plurality of internal email servers is determined by the application based on a priority list of the plurality of internal email servers;

sending, by the application, the test email through the plurality of internal email servers of the internal email system based on the priority list to an external email system, wherein the external email system has been provided with a public distribution list (PDL) to relay the test email back to the plurality of internal email servers;

receiving, by a second monitoring server, the test email relayed back from the external email system through the plurality of internal email servers;

processing, by the second monitoring server, the test email;

updating, by the second monitoring server, the entry in the data store with information collected along a delivery path of the test email, wherein the information comprises each internal email server of the plurality of internal email servers that passed the test email along the delivery path and a timestamp associated with the test email at each internal email server of the plurality of email servers along the delivery path;

in response to a determination that the test email is not received by the second monitoring server within a predefined period of time due to a delay, determining, by the application, which internal email server of the plurality of internal email servers caused the delay based on the information; and sending, by the application, an alert in response to the determination that the test email is not received by the second monitoring server within the predefined period of time.

14. The method of claim 13, wherein an outgoing email server is recorded in the entry in the data store.

15. The method of claim 13, wherein the second monitoring server updates a time of email receipt by a returning email server in the entry of the data store.

16. The method of claim 13, wherein individual test emails are built by the application and routed through each internal email server of the plurality of internal email servers.

* * * * *